Feb. 26, 1924.

H. H. VREELAND

KITCHEN UTENSIL

Filed June 27, 1922

1,484,917

INVENTOR.
HARRY H. VREELAND,
BY
ATTORNEYS.

Patented Feb. 26, 1924.

1,484,917

UNITED STATES PATENT OFFICE.

HARRY H. VREELAND, OF SPRINGFIELD, MASSACHUSETTS.

KITCHEN UTENSIL.

Application filed June 27, 1922. Serial No. 571,170.

*To all whom it may concern:*

Be it known that I, HARRY H. VREELAND, a citizen of the United States, residing at Springfield, county of Hampden, State of Massachusetts, have invented a new and useful Improvement in Kitchen Utensils, of which the following is a specification.

This invention relates to an improved kitchen utensil and comprises, in a simple form and combination, several features adapted for different and distinct uses. It is of especial value in that it reduces the number of utensils now in general kitchen use, is very easily and cheaply constructed, and requires no special skill in its use. Some of its features provide an utensil which fills a long felt want in the kitchen.

My invention further does away with the use of the ordinary dish cloth, now so common in use in removing hot dishes and the lids of same without the necessity of putting the hands into the oven. It is also used for removing all kinds of roasting pans, pie plates. In the present method of handling Pyrex ware many pieces become cracked, but in using my device, the loss by cracking is reduced to a minimum.

Referring to the drawings:—

Figure 1:
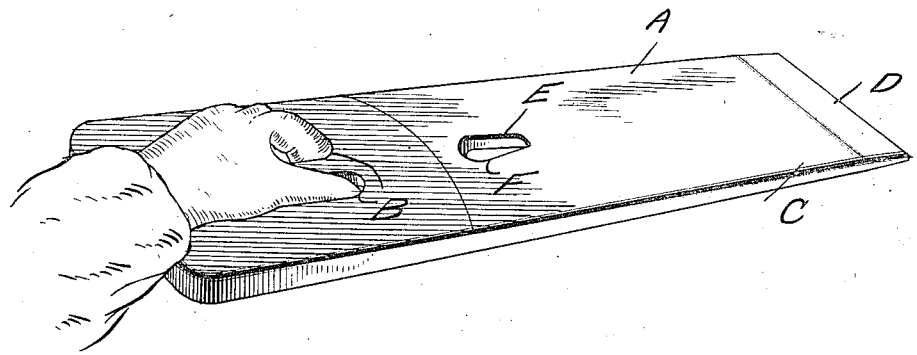
Figure 1 represents a plan view of my utensil.
Figure 2:
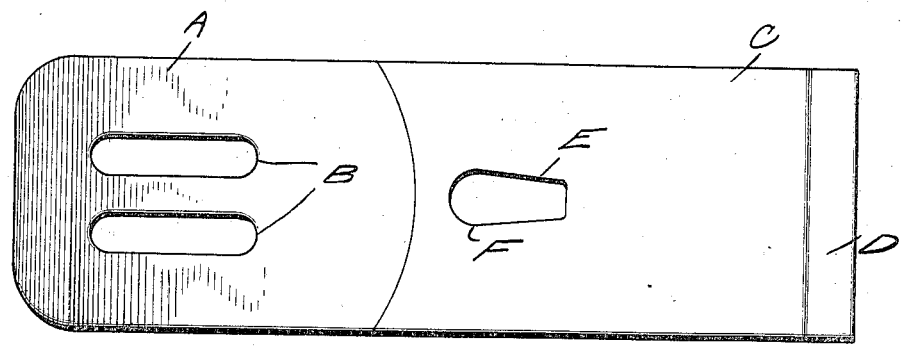
Figure 2 shows a view along one of the edges.
Figure 3:
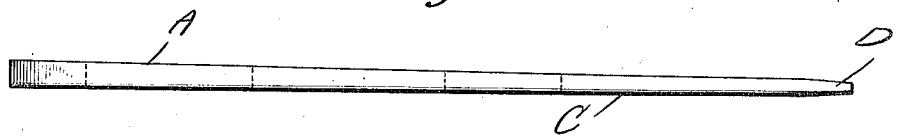
Figure 3 represents a perspective view of my utensil.

The device is integral in form, and is represented as a whole by A. B—B are hand holds or grips and may be shaped in any convenient manner but, preferably, of the shape as illustrated. The lower end of the device, C, is tapered and is bevelled along its lower edge as shown at D. The parts just described comprise one feature of my invention. It can be used in withdrawing hot plates, pots, pans, dishes or other cooking receptacles from the oven or from the top of the stove. The operator grasps the device by the hand holds, B—B, and slips or slides the bevelled edge, D, under the receptacle to be moved or withdrawn. After the bevelled edge has been forced under the receptacle a sufficient distance so that the device will support and balance the weight of the receptacle it can then be moved to any place desired.

This feature of the device is also adaptable for use in turning pancakes, chops, steaks, and in fact anything of such nature that is being cooked in a flat or shallow receptacle.

Between the hand holds or grips, B—B, and the bevelled edge, B, is a longitudinally converging hole or aperture, E. The end of this hole or aperture nearest the hand holds as shown at F, is a wider end and the hole or aperture gradually converges toward the end, G, nearest the bevelled edge of the device. This hole or aperture, in combination with other features of the device, is adaptable for use in lifting the tops of pots or pans which have thereon a button or knob. When it is desired to remove the lid or top from a pot or pan the operator grasps the hand holds, B—B, and places the wider end of the hole, E, down over the knob. The operator then draws the device towards him until the narrow end of the hole or aperture fits around the flange or button to be generally found upon the knobs so as to form a temporary grip upon the same. Then the top or lid can be raised and moved so that examination can be easily made of the contents of the pot or pan.

Thus it will be seen, as heretofore mentioned, the use of the kitchen dish cloth in these operations can be dispensed with and the operator can move the pots, pans or other receptacles or can remove the tops or lids thereof without fear of dropping the same or being burnt by handling the same. In this way I provide an invention which greatly lessens kitchen work and greatly decreases the inconvenience connected therewith.

The utensil may be made of wood, aluminum or most any similar material and can be made of any desired form or size without departing from the spirit of my invention.

What I claim is:—

A kitchen utensil of integral form, having a forward beveled edge adapted to be slid or forced under a cooking receptacle in order to lift and remove the same, two elongated apertures near the rear edge of the utensil forming a hand grip and being disposed longitudinally with respect to the utensils and relatively close to each other, a wedge shaped aperture situated between the said elongated apertures and the forward beveled edge of said utensils, said wedge shaped aperture having its wide part disposed toward the rear of said utensils and converging towards the forward beveled edge thereof, substantially as described.

HARRY H. VREELAND.